(12) United States Patent
Westphal

(10) Patent No.: US 8,179,310 B2
(45) Date of Patent: May 15, 2012

(54) METHOD FOR SENSING A THREAT

(75) Inventor: Robert Westphal, Wangen (DE)

(73) Assignee: Diehl Stiftung & Co., KG, Nurnberg (DE)

( * ) Notice: Subject to any disclaimer, the term of this patent is extended or adjusted under 35 U.S.C. 154(b) by 269 days.

(21) Appl. No.: 12/161,581

(22) PCT Filed: Jan. 30, 2007

(86) PCT No.: PCT/EP2007/000777
§ 371 (c)(1),
(2), (4) Date: Jul. 21, 2008

(87) PCT Pub. No.: WO2007/088021
PCT Pub. Date: Sep. 8, 2007

(65) Prior Publication Data
US 2009/0027263 A1    Jan. 29, 2009

(30) Foreign Application Priority Data

Feb. 2, 2006    (DE) .......................... 10 2006 005 192

(51) Int. Cl.
*G01S 19/03*    (2010.01)
*G01S 19/17*    (2010.01)

(52) U.S. Cl. ............................... 342/357.4; 342/357.55

(58) Field of Classification Search ............. 342/357.55, 342/357.4
See application file for complete search history.

(56) References Cited

U.S. PATENT DOCUMENTS

| | | | |
|---|---|---|---|
| 5,424,744 A * | 6/1995 | Westphal | 342/27 |
| 5,757,310 A | 5/1998 | Millward | |
| 5,793,329 A | 8/1998 | Nakada et al. | |
| 6,232,922 B1 * | 5/2001 | McIntosh | 342/453 |
| 7,598,901 B2 * | 10/2009 | Tillotson et al. | 342/26 B |
| 7,952,511 B1 * | 5/2011 | Geer | 342/13 |
| 2001/0013839 A1 * | 8/2001 | Wurman et al. | 342/26 |
| 2005/0275582 A1 * | 12/2005 | Mohan | 342/13 |

FOREIGN PATENT DOCUMENTS

WO    2007088021 A3    8/2007

OTHER PUBLICATIONS

Cherniakov et al, "Air Target Detection via Bistatic Radar Based on LEOS Communication Signals," IEEE Proceedings Radar, Sonar, Navigation, Feb. 2002, vol. 149, No. 1, pp. 33-38.* Koch et al, "New Approach to a Multistatic Passive Radar Sensor for Air/Space Defense," IEEE AES Magazine, Nov. 1995, pp. 24-32.*
Wu, et al., "Wide-Angle Isar Passive Imaging Using Smoothed Pseudo Wigner-ville Distribution", 2001 IEEE, pp. 363-368.
Palmer, et al., "Passive Detection of Aircraft Utilising Shadowing Techniques", 2003, IEEE, pp. 423-428.

* cited by examiner

*Primary Examiner* — Gregory C Issing
(74) *Attorney, Agent, or Firm* — Scully, Scott, Murphy & Presser, P.C.

(57) ABSTRACT

A method employed for threat analysis based on the passive-radar principle, using the transmitter in navigation satellites, a plurality of receiving stations, which are operated distributed over wide regions, and at least one evaluation center. The receiving stations act as wake-up sensors, transmit their received signals to at least one evaluation center for comparison with expected signals from each navigation satellite and sensing of a threat. Depending on the result, radar systems are operated on a stationary or mobile basis, can then be used with their higher-quality antenna systems on a three-dimensional basis to obtain more precise details relating to a conspicuous entity and the threat which may possibly originate from it in a possible target region or to a mobile or stationary threatened object, and then to make it possible to decide on any currently required protective or defensive measures.

15 Claims, 4 Drawing Sheets

METHOD FOR SENSING A THREAT

BACKGROUND OF THE INVENTION

1. Field of the Invention

The invention relates to a method for sensing a potential threat to an object from an entity which passes radio links from navigation satellite transmitters to receiving stations.

That method is distinguished in that, without requiring any three-dimensional alignment, it can quickly monitor the entry of an entity, from which a threat could originate, from a potentially threatened, also mobile object, from the hemispherical airspace. This is achieved on the basis of the passive-radar principle using the coherent signal structures which are emitted from the available navigation satellite transmitters, are highly constant over time and are known in the same way as the orbit data for non-geostationary satellites. Their current received signals are evaluated for irregularities in particular such as secondary signals that are dependent on back scatter in comparison to the received signals to be expected, with secondary signals which are dependent on back scatter such as these being caused by an entity flying into the transmission paths from the satellite transmitters to the receiver of the object. The characteristics, which are similar to radar, of the satellite frequencies, in terms of the fact that they propagate largely in straight lines, and their modulation forms (spread spectrum and noise periods) which require correlation assist their suitability for monitoring the airspace based on the principle of multistatic radar with a passive secondary transmitter. Details can be found in that prior publication.

2. Discussion of the Prior Art

Because of the already available navigation satellite systems, the method of this generic type, as described in U.S. Pat. No. 5,424,744, which is commonly assigned to the assignee of this application, and the entire disclosure of which is incorporated by reference, can be used throughout the world without any investment requirements for the transmitters. It operates passively and therefore without posing any threat itself. However, once a supposed entity has been detected for the first time, its continuous observation is quite time-consuming in order to obtain information in particular about its velocity (based on frequency measurements), range (based on propagation time measurements) and position (relative to the location of that satellite whose transmitter is currently being received), with this information being that which is required to decide on and then to initiate any defensive reaction which may become necessary against the threatening entity. This can critically restrict the time interval which remains for a defensive reaction.

Against the background of these circumstances, the present invention is based on the technical problem of significantly improving the method mentioned initially, which has been proven per se, without any need to have to develop new technologies, or else just introduce them, that is to say using technological means which are already available, in terms of its efficiency with regard to the capabilities to make statements about the current threat scenarios, in order to improve the reaction times.

SUMMARY OF THE INVENTION

According to the invention, this object is achieved by the major features specified in the main claim. According to these features, the threat analysis is no longer carried out—or in any case no longer just carried out—from the currently determined irregularities there in comparison to the respective received signals to be expected for a potentially threatened stationary or mobile object, such as a power station or on board a transport aircraft which is flying slowly and at relatively low level, or in a vehicle convoy on land or on water; but instead of this, a multiplicity of receiving stations, which are distributed over a large area and are operated in a mobile and in particular also a stationary form beyond the potentially threatened object are now used—as well—for this purpose. Each of these receiving stations transmits the signals received from the respective transmitter in the individual navigation satellites which are currently being recorded successively or irregularities already derived therefrom to at least some of the other receiving stations and/or to at least one evaluation centre, for comparative analyses.

This transmission is preferably carried out using the Internet, because this system, which operates throughout the world, can be accessed without problems in a worthwhile manner from virtually all locations of receiving stations which can be operated in a stationary or mobile manner; and furthermore because the evaluation computers, which are likewise operated in a stationary or mobile manner, for analysis of the irregularities occurring at the receiving end, can communicate with one another directly, that is to say virtually synchronously in time, without any matching requirements.

A comparative analysis of the irregularities found is carried out in the numerous individual receiving stations, or in a small number of separately operated evaluation centres. Significant feature extractions are associated with specific back-scattering behaviours (which, for example, are stored in a knowledge database) of typical threat entities and with their threat scenarios, and the movement behaviour of the entity that is currently of interest can be identified from the rates of change of such comparative information. Any required precautionary measures such as emergency shut-down and evacuation of the power station and its environments, or preparation of protective and defensive facilities and/or escape movement manoeuvres for vehicles can then be initiated on the basis of results such as these.

Specifically if, for example in the case of a receiving station which is operated in a mobile or stationary manner, the expected received signal from a specific transmitter in a transmitter group, specifically a satellite system, is currently found to have failed, it is not yet necessarily feasible to draw a reliable conclusion about the existence of a threat, or even its type, just from the current irregularity. However, if a signal, even if, perhaps, it is an irregular signal, can be received at the same time at a receiving station which is positioned well away from this particular transmitter, then the signal failure that has been mentioned is then very highly probably not due to absorption but due to total reflection on the path of the radio link from the transmitter to the receiving station. If, therefore, a check is carried out to determine the receiving position in which a significantly increased reception level occurs for this particular transmitter at that time, which is very highly probably based on reception in particular of the mirror beam for example from a stealth configuration, it is possible to a certain extent to deduce from this the structure and/or the three-dimensional extent of the entity in question in order to emit a warning or, if necessary, to prepare a timely defensive reaction, not least when irregularities which occur in some other way also support this conclusion.

This is because a decision such as this can be made on a more justified basis the more accurately an image of the potential threat can be obtained from the various current irregularities which are recorded at widely different locations at the same time but virtually are uncorrelated with one another.

For evaluation purposes, it is particularly useful to compare the irregularities which occur with radiation aligned at a shallow angle synchronously in time with the irregularities from a steep incidence angle. The GALILEO transmitter group, which is currently being formed, is expediently used for the latter in the northern hemisphere because the major aspect of its satellite system is to cover the gap which is left by the GPS satellite system, which operates closer to the equator. The inclusion of the GPS satellite system in the evaluation is, on the other hand, particularly advantageous because this covers large areas, for example in the northern hemisphere, with a shallow incidence angle. In addition, it is possible to make use of the transmitters which are still available from the GLONASS satellite system, whose further upgrade has been announced.

In addition, with regard to the entity which represents the current potential threat, it is helpful to simultaneously record and analyze the currently occurring irregularities from as many spatial aspects as possible, that is to say at locations which are separated from one another by very long distances. Even a combination of observations at those locations of receiving stations being operated in a stationary manner which are positioned scattered over a small number of countries in different parts of the earth, where they may possibly originally have been operating for widely differing purposes, may be sufficient for this purpose.

Because this spherical location distribution then also allows the position of the entity that is currently of interest to be found more accurately, receiving stations with better antenna equipment than a commercially available satellite navigation receiving device, in particular devices with very narrow beam directional antennas, can be aligned precisely with the spatial co-ordinates or at least the spatial sector of the entity which is of interest since it may represent a threat. At least one such device should be designed to obtain further information about the structure and the kinematics of the critical entity, for example of a projectile which is approaching the threatened object, with the capability to be operated at least temporarily as an active radar. This radar station should be located well away from the position of the potentially threatened object and the area relatively close to it, so that the temporary radar operation, that is to say the proof against self-betrayal which then no longer exists, does not result in any hazard at all to the object which may possibly be threatened at that time.

Receiving stations which do not themselves carry out a situation analysis from the comparison of irregularities and their rates of change but only pass on the reception situation can be operated extremely cost-effectively, specifically effectively using the equipment of commercially available satellite navigation receivers, with their antenna device, for a simple omnidirectional characteristic. They then act, so to speak, as wake-up sensors when irregularities relating to the received signal currently to be expected from the receiving transmitter are found in their received signals, which are transmitted in a more or less unprocessed form to an evaluation centre. More detailed observations based on received signals from further receiving stations can then be taken into account and considered, if necessary, for threat analysis.

If at least a number of the receiving stations operate with antenna structures which differ from one another, non-matching irregularities can also be obtained for signature assessment purposes in all cases from approximately the same situation. This makes it possible to further increase the validity of the threat analysis since the recorded individual influences can then be provided with different weightings depending on the reception characteristics of the hardware.

The irregularities to be assessed are preferably obtained by monostatic and by multistatic evaluation based at least on the propagation time, amplitude, Doppler shift and polarization shift in the received signal which is currently being influenced by the critical entity, specifically with respect to the transmitted signal, which is known for the satellite transmitter currently being received in each case and is stored or, if required, is synthetically generated locally. According to an additional development of the invention, imaging methods which have been proven in radar technology, based for example on the ISAR principle (Inverse Synthetic Aperture Radar) may also be used for higher evaluation levels in the centres, in order to arrive at a threat assessment, which converges as quickly as possible, from the totality of the individual information items.

This very large-area monitoring of the airspace necessarily also covers those influences which are exerted, for example, by airline traffic on the reception of satellite signals, that is to say from entities from which no threat exists. In order to identify false alarms resulting from them, and to suppress them as far as possible, it is expedient to observe and evaluate the airspace in the relatively near surrounding area, for example covering several hundred miles, around a potentially threatened object, with regard to the tracks of entities operating therein in the form of commercial aircraft. Because appropriate radar systems are generally not available to the objects, what is referred to as a virtual radar image is expediently created for this purpose, such as that already known from the tracking of the movement of commercial aircraft by means of UHF reception and decoding of their transponder signals. As simple UHF receiver and appropriate software, which is likewise commercially available, makes it possible in this way to obtain information in particular about the identity, flight number, flight path, position, altitude and movement rates, therefore allowing individual azimuth and elevation displays. In addition, it is also possible to use the flight data, disseminated over the Internet, for civil air traffic for alignment with specific commercial aircraft, or for verification of specific commercial aircraft, which are not entities that endanger the object to be protected.

BRIEF DESCRIPTION OF THE DRAWINGS

Further developments and alternatives to the solution according to the invention are specified in the further claims and—also with regard to their advantages—in the following description of the sketch of one preferred exemplary embodiment of the invention. In this sketch, which is restricted to the essential points relating to function.

DETAILED DESCRIPTION OF THE INVENTION

Figure 1:
FIG. 1 shows an example of a worldwide distribution of a small number of evaluation centres.
Figure 2:
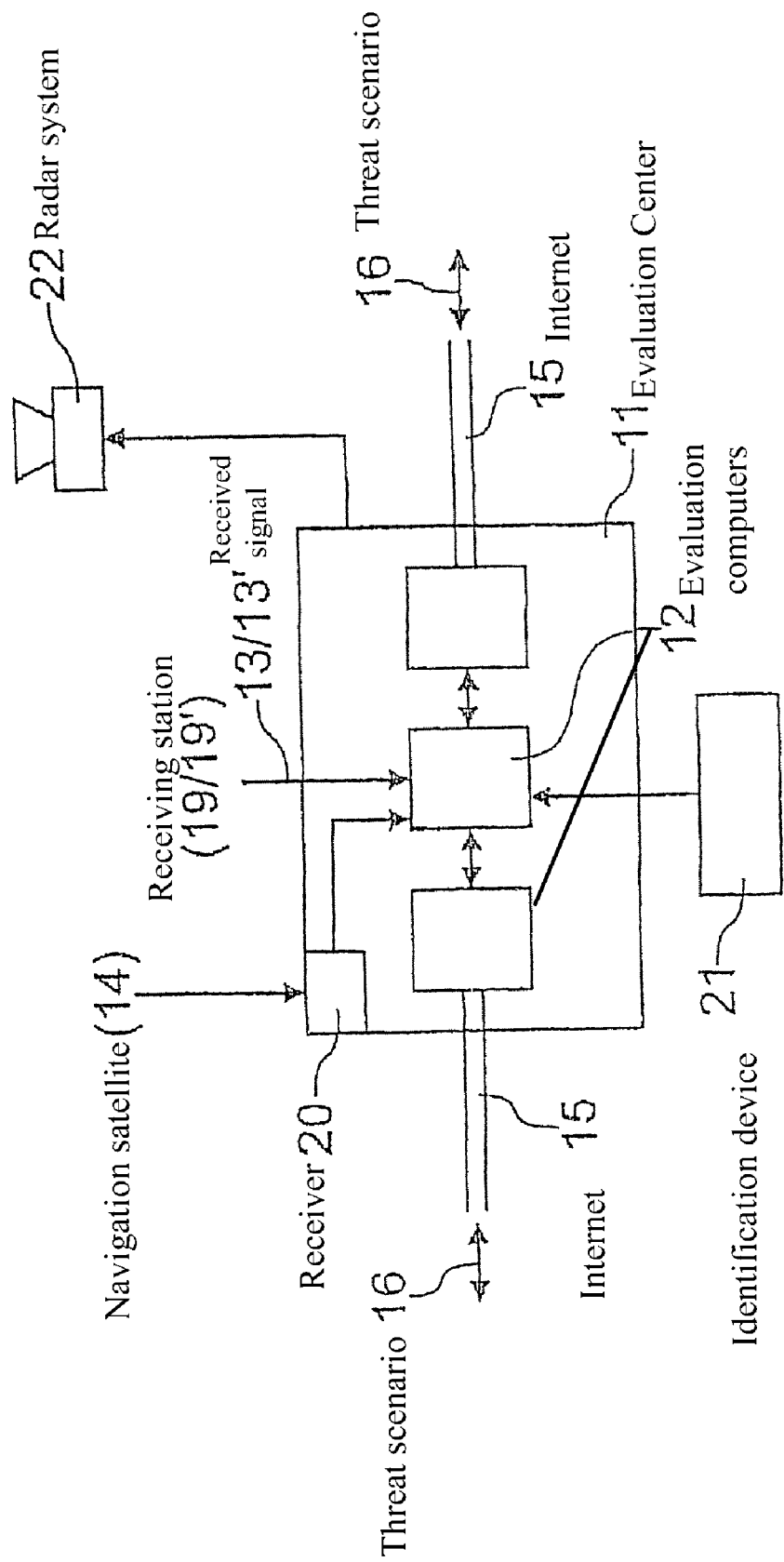
FIG. 2 shows the equipment of an evaluation centre such as this, in the form of a block diagram.

A virtually worldwide network comprising a relatively small number of evaluation centres 11 has locations, for example as shown in FIG. 1, in Alaska, on the west and east coasts of North America, in Mexico, Tierra del Fuego, Greenland, northern Finland, Russia, southern Italy, Egypt, South Africa, India, Japan and northern Australia. The evaluation centres 11 shown in FIG. 2 are fitted with evaluation computers 12 for actual received signals 13 from a plurality of navigation satellites 14 (FIG. 3) which are received at the same time and whose emitted signals are known, which are available for comparison with the disturbed received signals 13. The evaluation centres 11 are networked with one another via the Internet 15, in order to interchange typical threat scenarios 16 with one another. These threat scenarios 16 result from disturbances which are contained in the received signals 13 and are caused by potentially threatening entities 17 which may, in particular, be missiles on a collision course with the potentially threatened object 18.

Figure 4:
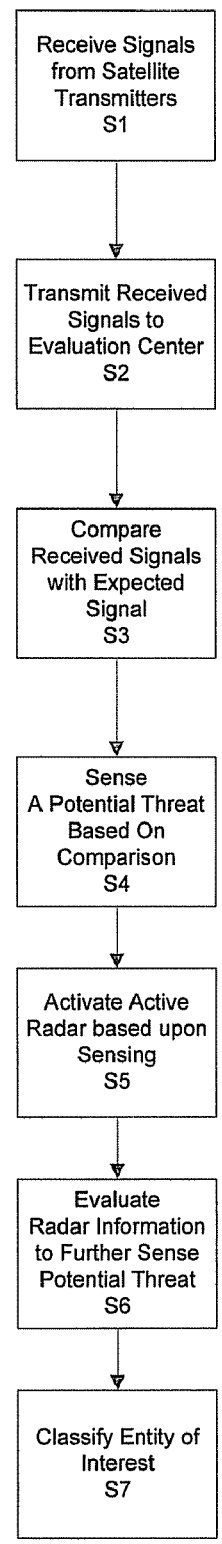
FIG. 4 illustrates an exemplary method for sensing a potential threat in accordance with the invention.

The received signals 13 (received in S1 as depicted in FIG. 4) are passed from receiving stations 19 to the evaluation centres 11(S2 as depicted in FIG. 4), as far as possible with a plurality of them in parallel, via the Internet or via radio links and these receiving stations 19, which are distributed arbitrarily over the regions of the earth, are operated as required continuously or else only sporadically, in a stationary manner or on board aircraft, land vehicles and maritime craft. The evaluation centres 11 may also be equipped with satellite receivers 20, while the objects 18 (in particular aircraft, land vehicles or maritime craft) typically do not have such receivers. These pass—preferably also via the Internet or else, for example, via direct radio links—their current received signals 13 to at least the closest accessible evaluation centres 11, and preferably in parallel to a plurality of evaluation centres 11.

The evaluation centres 11 perform comparative analyses on the signals received from the receiving stations 19 with signal that was expected to be received (S3 depicted in FIG. 4). Significant feature extractions are associated with specific back-scattering behaviours (which, for example, are stored in a knowledge database) of typical threat entities and with their threat scenarios, and the movement behaviour of the entity that is currently of interest can be identified from the rates of change of such comparative information (S4 as depicted in FIG. 4). Any required precautionary measures such as emergency shut-down and evacuation of the power station and its environments, or preparation of protective and defensive facilities and/or escape movement manoeuvres for vehicles can then be initiated on the basis of results such as these.

Figure 3:
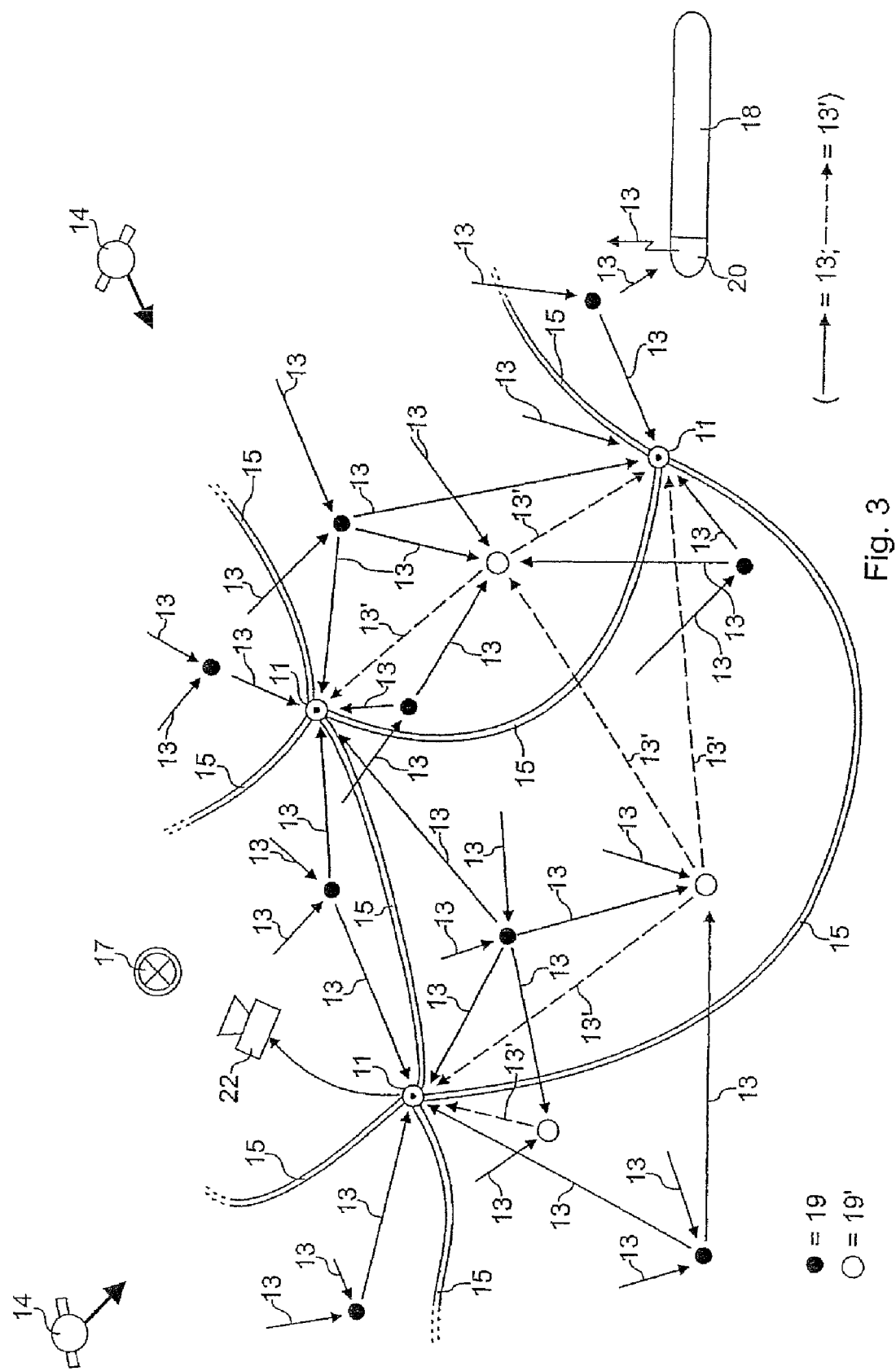
FIG. 3 shows the interaction of a very large number of receiving stations, operated distributed superregionally, with the evaluation centres, in the form of a block diagram.

Receiving stations 19' which are not being used per se for other tasks but are being operated specifically for the present warning system are expediently equipped with pre-processing which does not pass just the current received signals 13 to evaluation centres 11 but, in the interest of speeding up the threat analysis with regard to the criteria of interest, passes on pre-processed received signals 13'. Such specifically operated receiving stations 19' are preferably also equipped with different antennas in order to allow recording of divergent features in the disturbed satellite received signals 13, and to allow these to be evaluated for the threat analysis. FIG. 3 is based on the assumption that these receiving stations 19', with more complex equipment than just satellite receivers 20, also communicate with one another, in particular once again via the Internet, in the interests of more effective pre-processing such as this, in order to verify their analyses.

An identification device 21 which is based on tracking the movement path of the transponders in commercial aircraft can be used to carry out a rough classification of the entity 17 of interest (S7 as depicted in FIG. 4), and, if appropriate, can then pass a collision course warning to the entity 17 and/or to the object 18.

If the identity of the entity 17 or its track were still to remain uncertain during the course of the passive threat analysis (which is therefore proof against self-betrayal), or else if it is possible to extract sufficient indications from the received signals 13, 13' to establish that there is actually a predicted threat to the object 18, additional active radar surveillance is in some circumstances also worthwhile. To do this, the evaluation centres 11 order at least one radar system 22, which is located well away from the object 18 in order to avoid endangering it, and which is also not located on the track of the entity 17, in order as far as possible not to endanger itself either.

The effectiveness of the method, which is proved against self-betrayal, of threat analysis based on the passive-radar principle using transmitters in navigation satellites 14 is therefore further improved considerably without the use of significant additional technological complexity if, according to the invention, receiving stations 19 which are operated distributed over wide regions and have simple navigation satellite receivers 20, preferably equipped with different antenna characteristics, are used, for example, as wake-up sensors by transmitting their received signals 13 for evaluation of any current irregularities in comparison to the received signals to be expected, to at least one evaluation centre 11 in which a comparison is also carried out with irregularities currently detected in some other way. Depending on the result, radar system 22 which are available in any case and are operated in a stationary or mobile manner can then be used with their higher-quality antenna systems on a spatially directed basis in order to obtain more precise details about the entity 17 whose back-scattering behaviour is causing the irregularities and which is therefore conspicuous, for example an aircraft or a projectile, as well as the threat which may possibly originate from it to a possible target region and/or to a mobile or stationary threatened object 18 located in this region (S5 in FIG. 4), and in this way to allow decisions to be made about currently required protective or defensive measures (S6 in FIG. 4).

| List of reference symbols | |
|---|---|
| 11 | Evaluation centre (with 12) |
| 12 | Evaluation computer (in 11) |
| 13 | Received signal (from 14) |
| 14 | Navigation satellite (produces 13) |
| 15 | Internet |
| 16 | Threat scenario (from 13, by 11) |
| 17 | Potentially threatening entity (on a collision course with 18, interferes with 13) |
| 18 | Potentially threatened object |
| 19 | Receiving station (with 20) |
| 20 | Receiver (for 13) |
| 21 | Identification device |
| 22 | Radar system |

The invention claimed is:

1. A method for sensing a potential threat to an object from an entity that passes through a direct sight line between navigation satellite transmitters which form a satellite transmitter group, and a plurality of receiving stations, said entity causing irregularities to be added to expected signals transmitted from said navigation satellite transmitters, the method comprising:

receiving signals from said navigation satellite transmitters at each receiving station, each receiving station being remotely located from each other and located in a different receiving platform;

detecting, at each receiving station, irregularities relating to the received signals on a basis of a difference between an expected received signal and the received signal;

transmitting, in response to a detection of irregularities, by each receiving station that detected an irregularity, said received signals at each receiving station to at least one evaluation center, each of said at least one evaluation centers being regionally located;

evaluating, collectively, the signals received from each receiving station that transmitted the received signals; and sensing a potential threat based upon said evaluating.

2. The method for sensing a potential threat according to claim 1, wherein the method further comprises comparing any irregularities in signals received from a different satellite transmitter group with the irregularities from the said navigation satellite transmitters.

3. The method for sensing a potential threat according to claim 2, wherein said different satellite transmitter group has a different orbital inclination than said navigation satellite transmitters.

4. The method for sensing a potential threat according to claim 2, wherein said navigation satellite transmitters is a NAVSTAR GPS having a lower orbit than said different satellite transmitter group, said different satellite transmitter group being GALILEO.

5. The method for sensing a potential threat according to claim 1, wherein the receiving stations have with different antenna reception characteristics.

6. The method for sensing a potential threat according to claim 1, further comprising:

activating an active-radar directional antenna, based upon said sensing, on a spatially directed basis, said active-radar directional antenna being aligned with an object corresponding to a sensed potential threat to obtain information relating to the entity; and evaluating the obtained information and the irregularities to determine a response to the potential threat.

7. The method for sensing a potential threat according to claim 1, wherein each receiving station transmits the respectively received signals via Internet.

8. The method for sensing a potential threat according to claim 1, wherein the said transmitted signals from each receiving station are analyzed on the basis of propagation times, amplitudes, Doppler shifts and polarization shifts.

9. The method for sensing a potential threat according to claim 1, wherein the received signals are analyzed using an imaging method.

10. The method for sensing a potential threat according to claim 9, wherein said imaging method is based on Inverse Synthetic Aperture Radar (ISAR) principles.

11. The method for sensing a potential threat according to claim 1, further comprising:

classifying an entity of interest by tracking a path of transponder signals therefrom.

12. The method for sensing a potential threat according to claim 6, further comprising using the active-radar directional antenna that is positioned distant from a position of the object and is beyond the track of the potentially threatening entity.

13. The method for sensing a potential threat according to claim 1, wherein at least one characteristic of said irregularities is extracted from said transmitted signals from each receiving station and compared with refraction characteristics of entities posing as a threat and its associated threat scenarios.

14. The method for sensing a potential threat according to claim 13, wherein said refraction characteristics of entities posing as a threat and its associated threat scenarios is stored in a database in said at least one evaluation center.

15. The method for sensing a potential threat according to claim 1, further comprising:

receiving signals from said navigation satellite transmitters by the at least one evaluation center; and comparing the received signal from said navigation satellite transmitters with each of the signals received from each receiving station that transmitted the received signals to determine the irregularities.

* * * * *